W. KEIRN.
VISE.
APPLICATION FILED MAR. 19, 1907.
915,184.
Patented Mar. 16, 1909.
Fig. 1.
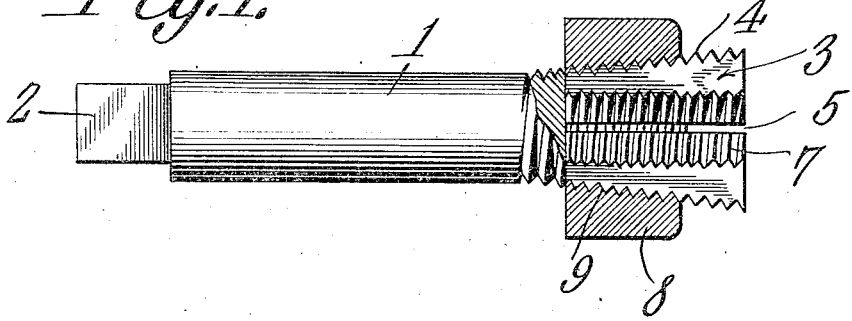
Fig. 3.
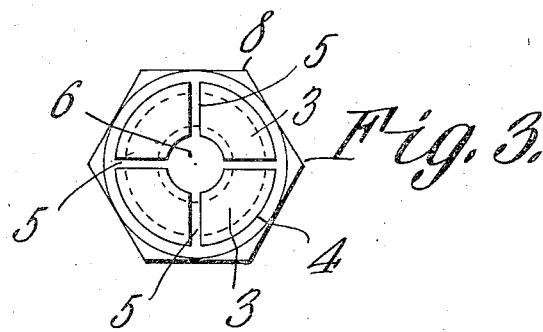
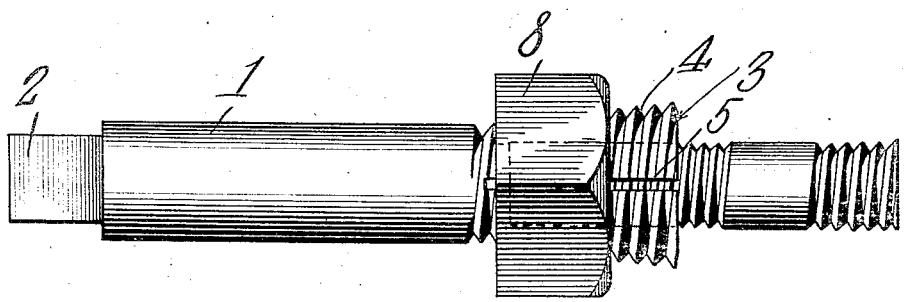
Fig. 2.
WITNESSES:
William Keirn,
INVENTOR
By C. A. Snow & Co.,
ATTORNEYS

UNITED STATES PATENT OFFICE.

WILLIAM KEIRN, OF WICHITA, KANSAS.

VISE.

No. 915,184.  Specification of Letters Patent.  Patented March 16, 1909.

Application filed March 19, 1907. Serial No. 363,190.

*To all whom it may concern:*

Be it known that I, WILLIAM KEIRN, a citizen of the United States, residing at Wichita, in the county of Sedgwick and State of Kansas, have invented a new and useful Vise, of which the following is a specification.

This invention relates to vises for gripping and holding stud bolts, nipples, and other objects having screw threads thereon.

The object of the invention is to provide a simple form of device of this character which will tightly grip the threaded object without injuring the threads thereon, said device having simple and efficient means whereby the same can be tightly clamped upon the object therein.

Another object of the invention is to provide a device of this character formed of two parts, the jaws of said device being formed integral with the body thereof. Heretofore in the construction of devices of this character it has been customary to provide the same with removable threaded members connected to the jaws of the tool, one or more of said jaws being pivotally connected. This construction has added considerably to the cost of the device as well as impaired its efficiency.

It is the object of the invention to overcome these objectionable features by simplifying and strengthening the construction of the device as well as cheapening its cost.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a section through the clamping portion of the device, the balance thereof being shown in elevation; Fig. 2 is a side elevation showing the device in position upon a stud bolt; and Fig. 3 is an end view of the device.

Referring to the figures by characters of reference, 1 is a shank preferably cylindrical in form and having an angular head 2 at one end designed to be engaged by a wrench or other device whereby the shank may be held against rotation. One end of the shank is gradually enlarged to form a frusto-conical head 3 having screw threads upon its outer surface, as shown at 4. This head is slotted longitudinally as shown at 5 to form a plurality of similar jaws, the inner or adjoining edges of which form a bore 6 and are screw threaded as shown at 7. A clamping sleeve 8 in the form of a nut surrounds the jaws constituting the head and has a tapered screw threaded opening 9 therein designed to engage the threads 4. It is of course understood that the jaws constituting the head 3 constitute an integral part of the shank 1 and therefore the entire device is formed of but two parts, to wit, the shank and the portions formed therewith and the clamping sleeve.

The bore 6 is proportioned so as to receive the bolt or nipple to be rotated so that the threads upon said bolt or nipple will be engaged by the threads 7. When it is desired to rotate a threaded object by means of this tool said object is screwed into the bore 6 formed by the jaws 3 and the head 2 is held by means of a wrench or other device while the sleeve 8 is screwed upon the jaws 3. As the outer faces of these jaws are inclined the jaws will be pressed inward against the threaded portion of the bolt or nipple and will tightly bind thereon and hold it against rotation. It will be seen that the device is very simple, durable and inexpensive in construction and constitutes an efficient means for holding threaded objects without injury to the threads thereon.

What is claimed is:

A vise comprising a solid cylindrical shank having a reduced angular head at one end and a frusto-conical enlargement at its other end, said enlargement gradually increasing in diameter from the shank to the free end of the enlargement, said shank being smooth throughout its length and said enlargement being exteriorly screw-threaded, there being a screw-threaded bore extending longitudinally within the enlargement and terminating adjacent the small end of said enlargement, said enlargement being also provided with spaced longitudinal slots intersecting the threads upon the outside surface and the wall of the bore, those portions of the enlargement between the slot forming jaws, and a nut having a frusto-conical opening extending therethrough and provided with screw-threads therein, said nut being designed to slip longitudinally along the shank 1 and against the enlarged end portion, the rotation of the nut upon said enlarged portion causing the contraction of said portion.

In testimony that I claim the foregoing as my own, I have hereto affixed my signature in the presence of two witnesses.

WILLIAM KEIRN.

Witnesses:
   H. F. RICE,
   ROY J. HUDSON.